United States Patent
Brewer et al.

(10) Patent No.: US 11,003,628 B2
(45) Date of Patent: May 11, 2021

(54) VARIABLE DRIVEN, CUSTOMIZABLE INFORMATION MANAGEMENT SYSTEM

(71) Applicants: Michael A. Brewer, Centennial, CO (US); Frederick C. Wagner, Centennial, CO (US)

(72) Inventors: Michael A. Brewer, Centennial, CO (US); Frederick C. Wagner, Centennial, CO (US)

(*) Notice: Subject to any disclaimer, the term of this patent is extended or adjusted under 35 U.S.C. 154(b) by 1031 days.

(21) Appl. No.: 15/444,561

(22) Filed: Feb. 28, 2017

(65) Prior Publication Data

US 2017/0169047 A1 Jun. 15, 2017

Related U.S. Application Data

(63) Continuation of application No. 12/147,347, filed on Jun. 26, 2008, now abandoned.

(51) Int. Cl.
*G06F 16/16* (2019.01)
*G06F 16/21* (2019.01)

(52) U.S. Cl.
CPC .......... *G06F 16/168* (2019.01); *G06F 16/164* (2019.01); *G06F 16/217* (2019.01)

(58) Field of Classification Search
CPC ..... G06F 16/168; G06F 16/217; G06F 16/164
USPC .......................................................... 707/797
See application file for complete search history.

(56) References Cited

U.S. PATENT DOCUMENTS

| | | | | |
|---|---|---|---|---|
| 5,953,707 A * | 9/1999 | Huang | ................... | G06Q 10/06 705/7.25 |
| 6,591,278 B1 * | 7/2003 | Ernst | ....................... | G06F 16/25 |
| 6,727,927 B1 * | 4/2004 | Dempski | ............... | G06F 16/338 715/853 |
| 7,278,097 B1 * | 10/2007 | Tanizaki | ................. | G06F 16/29 715/205 |
| 7,461,077 B1 * | 12/2008 | Greenwood | .......... | G06F 3/0482 |
| 2002/0178267 A1 * | 11/2002 | Ooki | ....................... | H04L 29/06 709/227 |
| 2004/0186762 A1 * | 9/2004 | Beaven | .................. | G06Q 40/04 705/7.27 |
| 2004/0189762 A1 * | 9/2004 | Chen | ..................... | B41M 5/508 347/100 |
| 2009/0094271 A1 * | 4/2009 | Brewer | ................. | G06F 16/217 |

* cited by examiner

*Primary Examiner* — Alford W Kindred
*Assistant Examiner* — Cecile H Vo
(74) *Attorney, Agent, or Firm* — Williams Intellectual Property; Benjamin F. Williams

(57) ABSTRACT

A variable driven, customizable data management system creates a descendent child module controllable by parameters set through action of a precedently operated architecture input module. Customizable child modules are expediently creatable to enable management of complex and disparate data sets per the requirements of particular end-users. Source files of varying file-types are determinable over network and data is extractable and pulled to populate a plurality of containers operative in the child module. Edits made to data displayed as part of the child module may be pushed over network to overwrite source files as amended. Complex data sets are thus collatable from disparate locations, over network, between partitions, even across platforms, whereby pulled data is rendered interactive for end-user control, despite local and root disunity, and displayed for interaction at a single instance.

13 Claims, 6 Drawing Sheets

VARIABLE DRIVEN, CUSTOMIZABLE INFORMATION MANAGEMENT SYSTEM

CROSS-REFERENCE TO RELATED APPLICATIONS

This continuing application claims the benefit of nonprovisional application Ser. No. 12/147,347 filed on Jun. 26, 2008.

FEDERALLY SPONSORED RESEARCH OR DEVELOPMENT

Not Applicable

INCORPORATION BY REFERENCE OF MATERIAL SUBMITTED ON A COMPACT DISK

Not Applicable

COPYRIGHT NOTICE

Some portions of the disclosure of this patent document may contain material subject to copyright protection. The copyright owner has no objection to the facsimile reproduction by anyone of the patent document or ensuing disclosure as it appears on record at the Patent and Trademark Office, but otherwise reserves all copyright rights whatsoever.

BACKGROUND OF THE INVENTION

Data sets generable in the twenty-first century are often large and complex. Networks of information now span multiple nodes, multiple databases, between individual partitions, even across platforms. Some industries and businesses require communication between multiple users who may not utilize compatible data file-types. Currently users confronted with assembling large data sets for customers, clients, and patients, for example, may employ local iterations of preexisting files whereby amendment to an iteration of a particular file is not always rendered by amendment of the preexisting file of which the amended file was iterative. Presently, shared networks enable access to shared partitions and drives, whereby local files are swapped between users. Problems of duplication and non-compatibility persist. Data entry is often duplicative as retrieved data is repeatedly entered into end-user systems. What is needed is a variable driven, customizable data management system which enables access to disparate files rendered accessible across platforms spread over non-uniform locations.

But devising individualized data management systems is expensive and laborious. Many such data management systems as customized to meet end-user specifications take months of programming, to generate particular instances having a single use. What is needed is a means of generating customized information management systems by use of an architecture input module devised to expediently create, configure, and format a descendent child module customized to meet the needs of multiple end-users operating between large and disparate data sets that require frequent interaction and management.

FIELD OF THE INVENTION

The present invention relates to a variable driven, customizable data management system configured to enable expedient and unique generation of a descendent child module operative in instances devised to meet the peculiar needs of individual end-users. An architecture input module is precedently usable to create, customize, format and control individual iterations of a descendent child module, which child module is configured and customized to meet data handling requirements of individual end-users.

The descendent child module is operative to effect prompt and display fields onscreen wherein data is enterable by an end-user. Data is likewise displayable extracted and pulled from source files accessed over network. A plurality of containers enables hosting of extracted and entered data by unique location, whereby data is storable to memory for manipulation in the child module.

Disparate source files may be accessed to populate primary data fields and secondary data fields whereby first order and second order data are displayable associated for display in the child module. Secondary data fields contain second order data which is subordinate to first order data displayed in primary data fields.

Amendment or edits made to data displayed in the child module may be pushed over network to overwrite the particular source file from whence the data was pulled. The child module therefore operates as a portal to access and manipulate data sets collected and assembled over network from disparate locations, for example, to codify and collate said data sets into displayable relationships customizable to end-user requirements, whereby end-users may manipulate data sets accordant with their individualized needs. Thus multiple databases having multiple files and even multiple file-types are accessible by the system wherefrom data is extractable and pulled to populate associated prompt and display fields operative in the child module when said child module is run.

Some data is accessible by the child module and presented as an attachment value; that is, an executable file associated with a primary data or secondary data object. Attachment values may execute attached existing files of distinct file-types, such as, for example, an image file or files of a particular format considered useful to include as appended files to a particular container when devising the child module (or editing it) in the architecture input module. Some data may be extracted, transferred, and loaded as binary large objects whereby particular data is discoverable in existing files, extracted, transferred to a container for display in a prompt and display field, and there rendered available for editing by an end-user with the saved value pushed back to the source file whereby the source file may be edited in part by action effective through the child module.

User access is controllable by operation of at least one security mask to veil and conceal privileged data from unauthorized users. Tiered access is thus ensured. Search of all data identified and rendered accessible through the child module is enabled whereby generation of reports comprising specific data sets is enabled. Where desirable, iterations of previously created child modules are duplicable for expedient customization for use managing similar data requirements between distinct end-users.

SUMMARY OF THE INVENTION

The present variable driven, customizable data management system has been devised to present an architecture input module for user interaction whereby a descendent child module is creatable customized to the information management needs of a particular end user.

Information necessary for the running of any business in the twenty-first century is often composed of multiple file-types and associated in unique and complex ways. What is needed is a means of accessing disparate files, stored over network in separate locations and partitions, of varying file-types, for display and interaction in a single instance of a child module, whereby a user may interact with data collected at the child module and effect update to particular source files hosted remotely relative the child module by manual action effected through the child module. Further, input of data into the child module is effective to collect new data and push files into corresponding associated locations stored over network.

The present variable driven, customizable data management system, therefore, includes an architecture input module effective to create and control iterations of a descendent child module. The architecture input module is devised to customize unique iterations of the child module configured for particular end user data handling needs. The child module is therefore adaptable for use in handling and managing data flow unique to particular end users and may be rapidly created and deployed for a particular end user by setup and configuration at the architecture input module.

Command data is thus enterable into the architecture input module to setup and format the descendent child module. Command data includes field nominative strings and data input strings. Field nominative strings name, classify, and define descendent prompt and display fields operative when the descendent child module is run, and data input strings control layout, formatting, and association of root and source files executable in each of a plurality of containers operative when the descendent child module is run.

Each of the plurality of containers provides a unique address wherein a data is storable, populated by a user or extracted from a remote storage location, whereby said data is interactively presented to an end user when the child module is run. Each of the plurality of containers is associable and displayable as prompt and display fields and may include, for example, extracted and loaded data (such as, for example, a name of a person, say, pulled from a .pdf file stored in a sourced database over network, and then rendered as text) and data presented as an attachment value (such as, for example, an extracted, transferred, and loaded .jpeg image file corresponding to a particular datum). File-types may be articulated for extraction, transfer, and loading into the child module for interaction therewith as binary large objects (BLOBs) whereby data objects are re-creatable for population, display, and interaction at the child module.

Data may be displayed as primary data, as part of a primary data field, or secondary data, as part of a secondary data field depending from the primary data object. Secondary data is subordinate to primary data, and primary data is thereby ordinate to secondary data. Secondary data may be stored associated with primary data and contingent therewith. Thus, for example, primary data may include an account number, patient name, docket number, or other identifying or ordinate value to which secondary data is thereby dependable. Secondary data, therefore, likewise includes an address, for example, contact information, appendant files, an image file, diagnostic files, payment information, and the like—data that is subordinate to primary data. Further, data may be static or dynamic—that is, unchanging without interaction by an end-user (such as a primary data object), or represented as a calculable value derived from other data, and displayable as a computed value (such as a person's age being displayed as a function of a date of birth data object and a current date accessible over network, for example).

To assist a user visually when operating the child module, containers are displayable onscreen as a re-orderable file display tree. Containers displayed as the re-orderable file display tree are independently arrangeable, orderable and associable for display irrespective of back-end association of files loadable by each container. A user may, therefore, order files for display and navigation by setting and defaulting views of the re-orderable file display tree.

The present variable driven, customizable data management system, therefore, enables operation of a child module as a single instance by which disparate files of varying file-type are accessible, collectable, displayable and rendered for interaction with an end-user. Amendments and edits made to data displayed and accessed through the child module are pushed to overwrite root files and source files in said root files' and source files' discrete locations—which may be cross platform and between independent partitions and networks. The present invention, then, not only expedites creation of customizable child modules for information management, articulated, formatted, and customized to particular end-user requirements (such as, for example, a hospital patient in care system having first order patient identifiers, appendant diagnostics information, insurance information, and payment histories, versus an inventory management system, say, having variable product categories sold to different customers at a variety of price points, for example), it further allows access to disparate, disconnected data sets united by unique association of secondary data and primary data housed among sourced databases accessible over network.

Thus has been broadly outlined the more important features of the present variable driven, customizable data management system so that the detailed description thereof that follows may be better understood and in order that the present contribution to the art may be better appreciated.

Objects of the present variable driven, customizable data management system, along with various novel features that characterize the invention are particularly pointed out in the claims forming a part of this disclosure. For better understanding of the variable driven, customizable data management system, its operating advantages and specific objects attained by its uses, refer to the accompanying drawings and description.

DETAILED DESCRIPTION OF THE DRAWINGS

With reference now to the drawings, and in particular FIGS. 1 through 7 thereof, example of the instant variable driven, customizable data management system employing the principles and concepts of the present variable driven, customizable data management system and generally designated by the reference number 10 will be described.

Referring to FIGS. 1 through 7 a preferred embodiment of the present variable driven, customizable data management system is illustrated.

The present variable driven, customizable information management system has been devised to enable expedient creation of a graphically displayable and interactive child module, customizable to meet individualized requirements of data management as pertaining to a particular end user. Data accessed and displayed in the descendent child module is assembled from multiple root files store locally and remotely, as case may be, whereby disparate data is viewable for interaction in a single instance.

Figure 1:
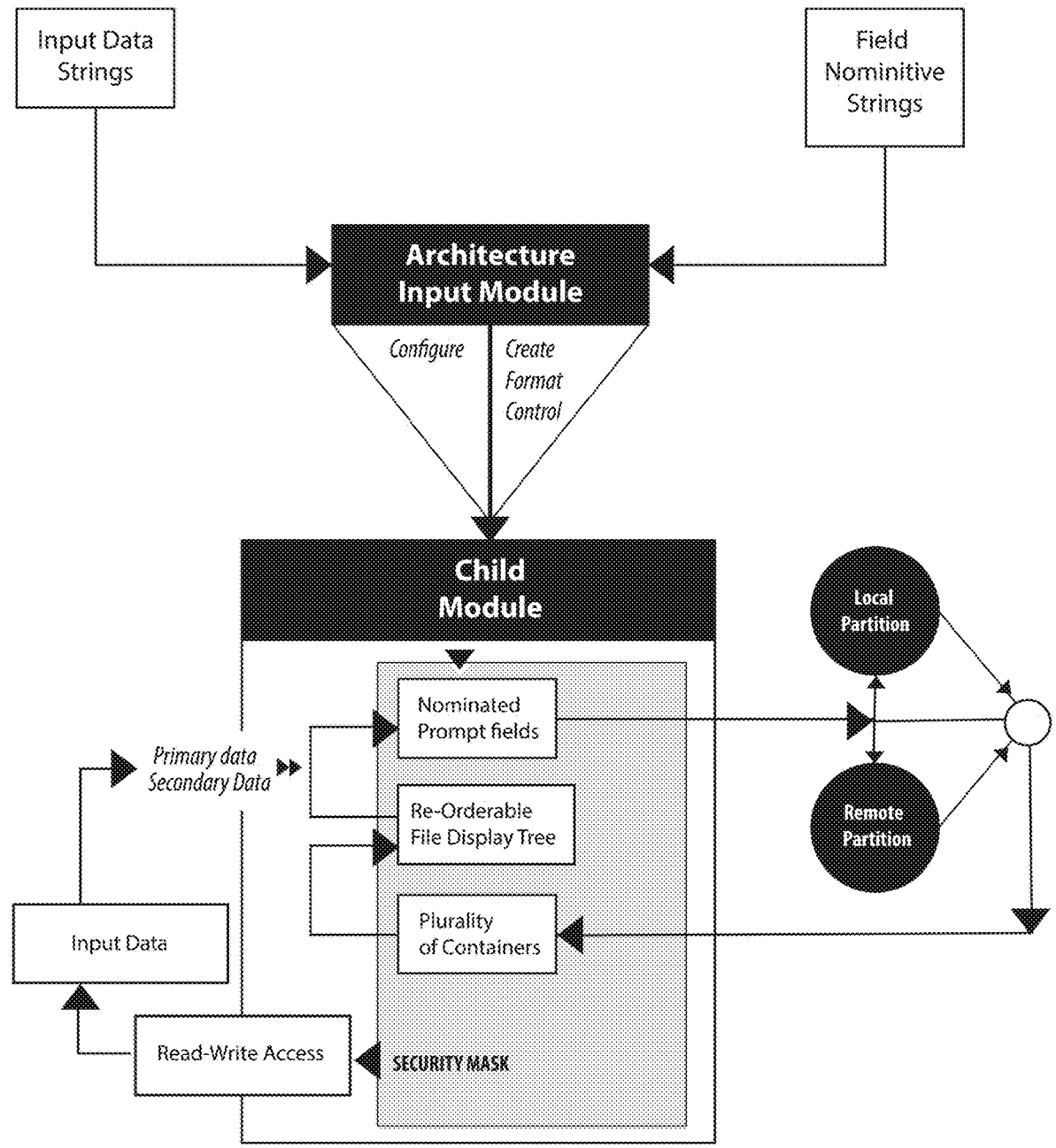
FIG. 1 is a flow diagram of an example embodiment of the variable driven, customizable data management system.

As illustrated in FIG. 1, the child module is creatable, updatable, and formattable, by precedent use of a graphically displayable and interactive architecture input module, wieldable by a user to control and delimit the descendent child module by receipt of particular command data, entered by a user as unique data values of input data strings and field nominative stings, elected to name corresponding prompt and display fields subsequently displayable as part of the associated child module, which corresponding prompt and display fields are directed to capture particular prompted data enterable by a targeted end user operating the child module, and, alternately, to display relevant data extracted, transferred, and loaded from associated root files for interaction and display in the child module. The architecture input module, therefore, enables a user to expediently set up an associated, customized, unique child module, devised for specific handling of data and ordering of information as desired, effective by graphical display, to enable entry of input data strings and field nominative strings whereby the associated child module is created, formatted, laid out, controlled, and associated with relevant root files of different file-types stored in different locations, as case may be.

The variable driven, customizable information management system, therefore, includes a graphically displayable architecture input module configured to capture command data enterable by a user. Command data is taken to include all input strings enterable into the architecture input module effective to configure and format the associated child module. Command data is enterable as input data strings and field nominative strings. Input data strings include data selections made within the graphical display, such as selectable settings configurable by selection between graphically articulated options, said options devised for controlling classification of fields, layouts, and formatting of instances of the associated child module. Input data strings may likewise be entered as numerical and textual data inputtable to control layout options by designation of a position, for example, of selected elements within a coordinate system to control position of said selected elements displayable onscreen as part of the child module.

Field nominative strings render static data in the associated child module. Typically textually entered, field nominative strings are ascribed to denominate, classify, and name descendent prompt and display fields displayable as part of the associated child module. Field nominative strings may also be selectable values selected from a list of finite options, such as are presented by a drop down menu, for example. A field nominative string, therefore, may be entered to designate a particular descendent prompt and display field as "Last Name", for example, whereby the descendent prompt and display field displayed as part of the associated child module is designated by the nominative "Last Name" and configured to receive entry of data corresponding to end user input of a person's last name, therefore. Entry of the data may be effective manually into the child module directly, or pulled into the child module from associated root files, as will be described subsequently.

The associated child module is therefore devisable and customizable to meet the data handling requirements of a specific end user coordinating between multiple data sets, file-types, even platforms. The associated child module is expediently configurable since the architecture input module controls configuration of all variables associated with creating, formatting, and laying out the graphical user interface comprising instances of the associated child module, once said child module is finalized through action of the architectural input module.

Each instance of the child module includes a plurality of containers wherein locally and remotely hosted data files are displayable for presentation to, and interaction with, an end user. Each of the plurality of containers comprises a designated location wherein locally and remotely hosted data files are selectively accessible, depending on prompted input strings entered by the end user. Each of the plurality of containers, therefore, defines a unique location—accessible over a local area network or a wide area network, as case may be—devised to host a particular datum. Some containers may be static (that is, data stored there is unchanging therein unless updated by an end user, either through the child module directly or at the associated root file when accessed over network) and some may be dynamic (that is, data stored there comprises a variable value computed each time an instance of the child module is opened, or at other intervals as may be operated by the child module).

The child module also includes and presents as part of its graphical user interface a plurality of primary data fields and a plurality of secondary data fields. Each of said plurality of primary data fields is devised to receive input of first order data from which subsequent second order data is enterable into corresponding secondary data fields. All second order data is subordinate to first order data; that is, second order data is dependent and contingent on precedent first order data. Thus a primary data field may, for example, be configured in the architecture input module to be denominated "Account Number", say, whereby secondary data fields, subordinate to "Account Number" may include, for example, "Name" and "Address" secondary data fields, devised to capture second order data corresponding to the unique name and address associated with the primary data comprising the unique account number entered precedently. Additional secondary data fields are associable subordinately to second order data, such as, for example, "Postal Code", data contingent upon second order data entered into the "Address" secondary data field, say. Thus, first order data and second order data entered into corresponding primary and secondary data fields are stored associable locally and associable remotely over network, as well be described subsequently.

Further, data rendered as particular preexisting file-types, such as, for example, files formatted as Portable Document Format (.PDF), or Document files (.DOC), or other file-types common to recording and transacting data (e.g. .JPG, .PNG, .XL, etc.), is entirely associable with each of the plurality of containers and displayable as an executable attachment value. Said existing data of particular file-types is thereby accessible to a user loading data accessed within a particular one of the plurality of containers. A user may, therefore, access and execute appendant files, for example, and upload and store appendant files, alongside relevant data retrievable in any particular one of the plurality of containers. Thus, for example, images, scans, or other data readily transacted as a relevant and existing file-type is nonetheless recoverable and usable interior to the child module in conjunction with data storable in an associated container. Such existing file-types may be storable as Binary Large Objects (BLOBs) and therefore be re-creatable from bit streams and torrents actually assembled over network. Further, existing file-types may be extracted from remote locations for execution in a particular one of the plurality of containers, whereby the child module is enabled to pull relevant appendant files of existing file-types across network, and reassemble the existing file-type for view therein. Interaction with the root file is enabled, whereby edits made through the child module may be pushed to edit the root file. Changes made to the root file locally likewise are pulled into the child module when run to access said root file.

Data accessed from within particular ones of the plurality of containers is likewise assemblable locally and remotely over network between a plurality of partitions and storage locations, as case may be whereat the data is stored locally, whereby data is constructible for read-write interaction from dispersed and non-unified locations. Data is thus extractable and assembled to populate the containers in the child module, even when data is stored remotely and disconnectedly. Further, data accessed between particular ones of the plurality of containers is likewise assemblable locally and remotely over network between a plurality of partitions and storage locations, whereby data accessible between containers is also constructible for read-write interaction from dispersed and non-unified locations.

Figure 2:
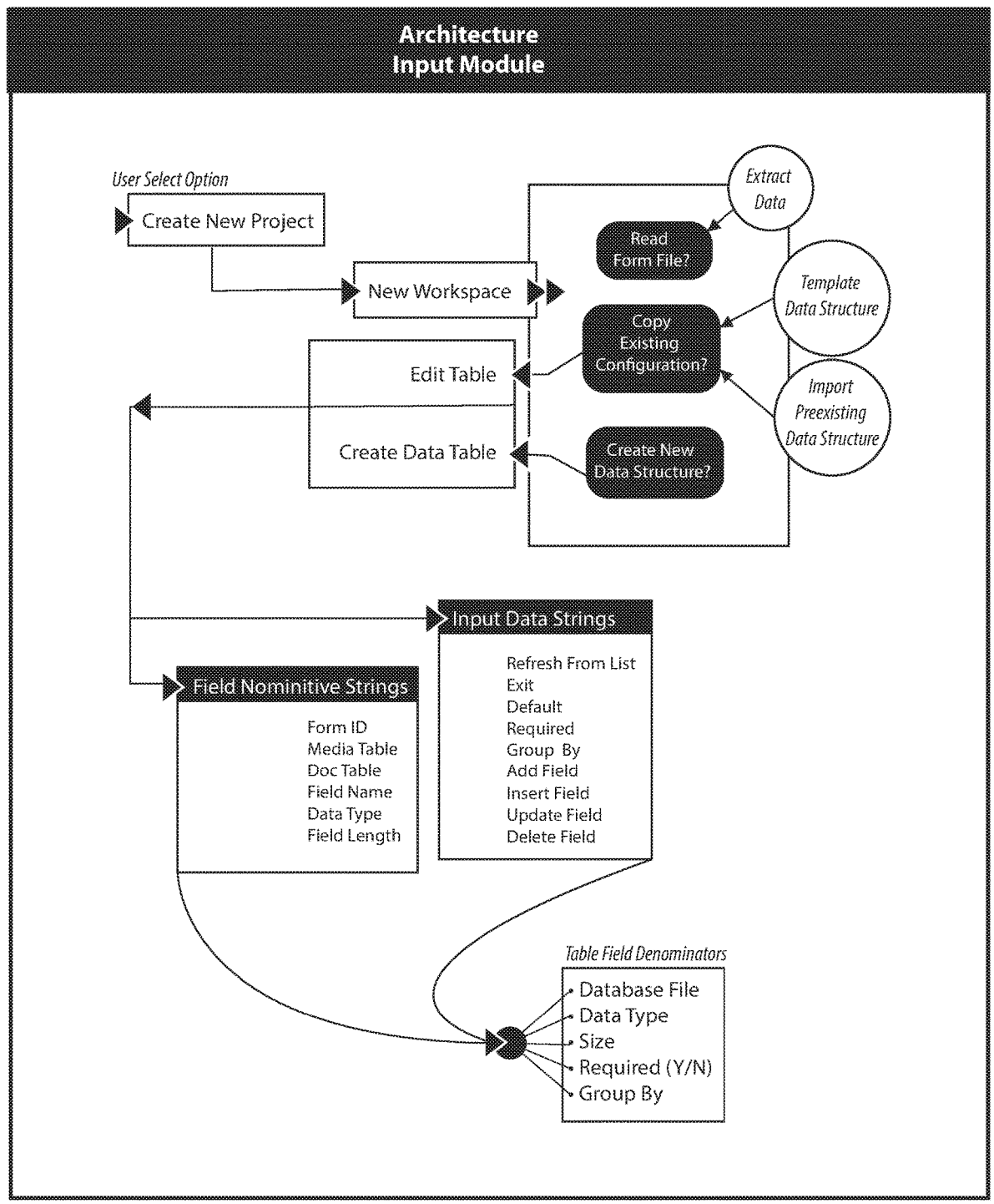
FIG. 2 is a flow diagram illustrating an example logic flow of an architecture input module useable to create, manage, and customize a descendent child module.

Organization of the child data module is effected through arrangement of the plurality of containers. As illustrated in FIG. 2, each of the plurality of containers is devisable by creation of tables, for example, creatable and editable in the architecture input module. Tables enable the organization, classification, and denomination of individual containers presented in the table as fields for display in the descendent child module, when said child module is run. Containers are definable by field nominative strings and input data strings wherein data is loadable accessed locally or accessed remotely over network. Containers are capable of capturing and/or editing data directly through the child module. Containers may display static data (that is, data that does not change between instances running the child module) and dynamic data (that is data that is computed from other data to each time an instance of the child module is run, or at other intervals as may be required by the child module). Containers may be configured in the architecture input module for handling of specific data input in the child module, or to display specific data loaded into the child module from associated database files, whether accessed locally or accessed remotely.

Figure 3:
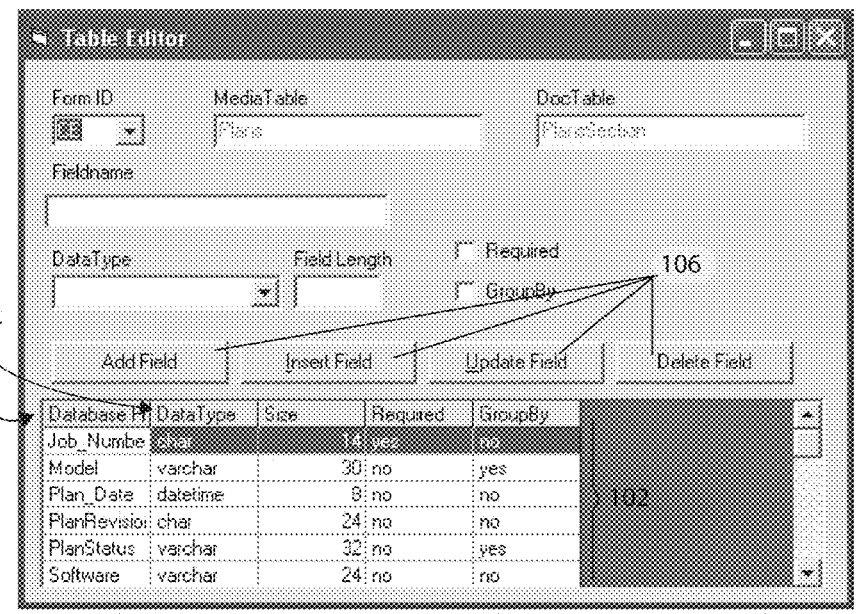
FIG. 3 is an example screenshot of a table editor operative in the architecture input module and usable to create, classify, denominate, and arrange a plurality of containers as part of a table integral to a child module.

For example, as shown in an example screenshot illustrated as FIG. 3, selection of "Database File" 100 denominates a container as part of a table 102 applicable to setup at least a portion of the child module, and may associate a corresponding database file (for example) with that particular container for display and control therein by action when the descendent child module is run. Data in the database file may therefore be extracted and loaded into the container when the child module is run for interaction with an end user through the child module.

A second order, subordinate "Data Type" 104 input value is selectable to define data displayable in the container once run as the child module, said data types including, for example: "Char", fixed-length non-Unicode character data up to 8,000 bytes long; "Datetime", a timestamp between Jan. 1, 1753 and Dec. 31, 9999; "Float", floating-point data, that is data having an unbounded range; "Int", integers between −2.1 billion and 2.1 billion; "Money", decimal numbers between −922 trillion and 922 trillion; "Nchar", fixed-length Unicode character data; "Real", floating-point data; "Smalldatetime:, a timestamp between Jan. 1, 1900 and Jun. 6, 2079; "Smallint", integers between −32,768 and 32,768; "Smallmoney", decimal numbers between −214 thousand and 214 thousand; "Tinyint", integers between 0 and 255; and "Varchar", variable-length non-Unicode character data. Data entered into the container when run as the child module is therefore controllable by settings selected in the architecture input module. "Add Field", "Insert Field", "Update Field" and "Delete Field" 106 enable control of the prompt and display fields associated with relevant containers creatable as tables.

Figure 4:
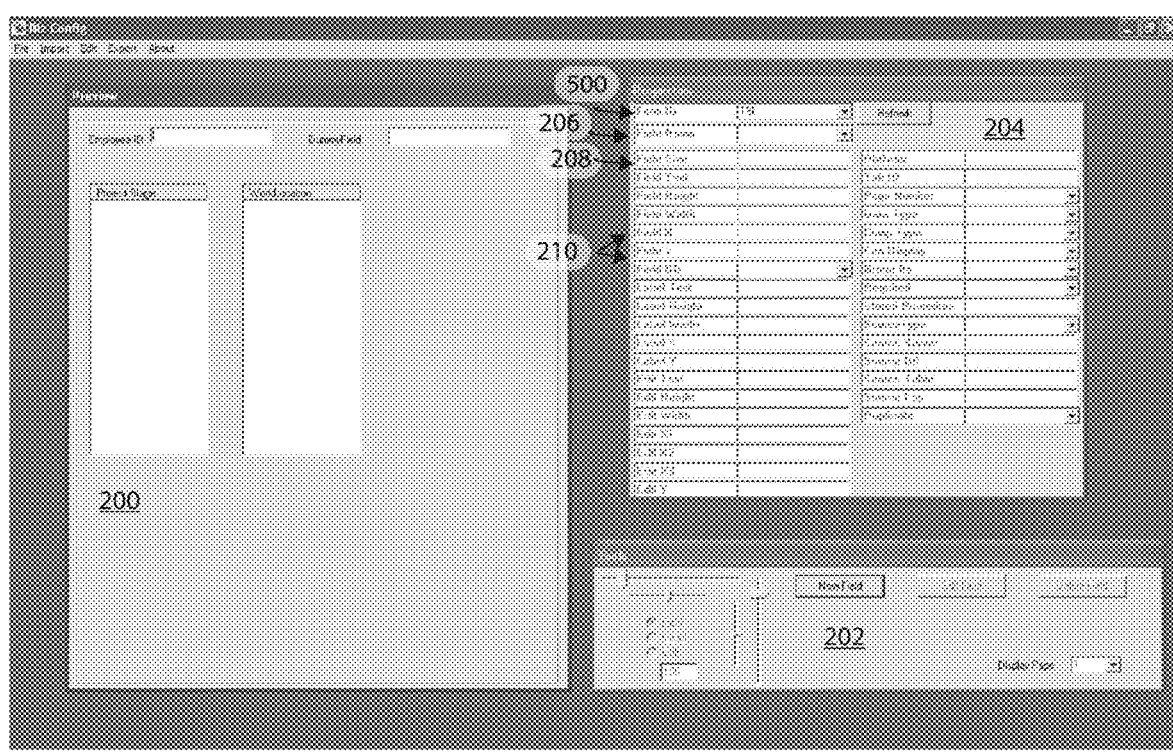
FIG. 4 is an example screenshot of a preview panel, a properties panel, and a tools panels, operative in the architecture input module and usable to source, associate, classify, and arrange data accessible through the plurality of containers.

Existing data is usable to configure tables for the descendent child module and may be edited and customized, as desired, whereby expedient set up of similar instances of child modules is enabled. As shown in the example embodiment shown in FIG. 4, a media viewer is provided wherein loaded values are editable to create a customized child module based on existing formatted and denominated containers of a previously rendered child module. Input data values are controllable by selection of items presented as part of "Properties" 200, "Tools" 202, and "Preview" 204 graphically displayed input panels, whereby a user is enabled to set configurations and constraints and edit the existing containers to load, run, and/or display unique data relative the previously created child module. Thus "Field Names" 206, which may be associated as nominatives for containers yet useful for the new child module, presented as a table identified by "Form ID" 500, may be changed to reflect new needs addressed by the iteration of the new child module. "Field Sizes" 208 may be altered to accommodate more or less data. Thus not all field nominative strings or input data strings need be changed, where relevant and useful container attributes are repeatable, as desired. FIG. 4 illustrates an example embodiment of a "Properties" 204 input panel, whereby associated input data strings are selectable as discrete values to format and layout and data classifications in the corresponding descendent child module identified by "Form ID" 500.

In the example embodiment illustrated in FIG. 4, containers are adaptable per user preference determinable by the data associated therewith. Containers are displayable in the child module as associated prompt and display fields and may be positioned within the graphical display of the child module by selection of input data values of the "Field X" and "Field Y" 210 options presented in the "Properties" input panel 204. Values selected therein position the associated container as a field displayed locatable by corresponding X and Y coordinates in a typical Cartesian plane applied onscreen. Thus each field displayable indicative of a unique container may be individually positioned upon the screen when run by the child module, and customized in appearance per the demands and dictates of the end user for whom, and/or project for which, the instant child module is being created.

Additional input data values selectable by action at the "Properties" input panel include:

"Field Text", used for flyovers, list view labels, and report field labels when run as the descendent child module.

"Field Height", determinative of the height of the displayed field associated with customized container. when run as the descendent child module.

"Field Width", determinative of the width of the displayed field associated with the customized container when run as the descendent child module.

"Field X", determinate of the onscreen horizontal location of the displayed field associated with the customized container when run as the descendent child module.

"Field Y", determinate of the onscreen vertical location of the displayed field associated with the customized container when run as the descendent child module.

"Field DD", defaults a date to display the current date in the displayed field associated with the customized container when run as the descendent child module.

"Label Text", determinative of what text is denominates the associated container when the descendent child module is run.

"Label Height", determinative of the height of the label field of the associated container displayable when the descendent child module is run.

"Label X", determinative of the onscreen horizontal location of the displayed label field associated with the customized container when run as the descendent child module.

"Label Y", determinative of the onscreen vertical location of the displayed label field associated with the customized container when run as the descendent child module.

"Edit Text", "Edit Height", "Edit Width", "Edit X1", "Edit X2", "Edit X3", "Edit Y", are additional examples, controlling displays settable through the architecture input module to customize tables displayable in the descendant child module.

Properties which may also be assigned to a container to control the field displayed include, for example, "TextBox", constraining the container to display as a text enterable field; "Dropdown", constraining the container to display as a drop down menu with selectable subordinate data (said subordinate data precedently entered as secondary data into the architecture input module); "DatePick", constraining formatting of data enterable into the container to display as a date, running second order "Datetime" or "Smalldatetime" data; "WebBrowser", enabling display of documents associated as existing files with particular containers running in the descendent child module; and "Listviews" allowing the user to enter multiple entries in the same displayed field and tied to a particular table. Thus, properties may be assigned to control and constrain data stored in each of the plurality of containers, displayable as unique fields in the descendent child module. Essentially, any container may be formatted to house data and display that data in the descendent child module as a particular data type or as a selectable option that further enables and controls subordinate and associated data.

Figure 5:
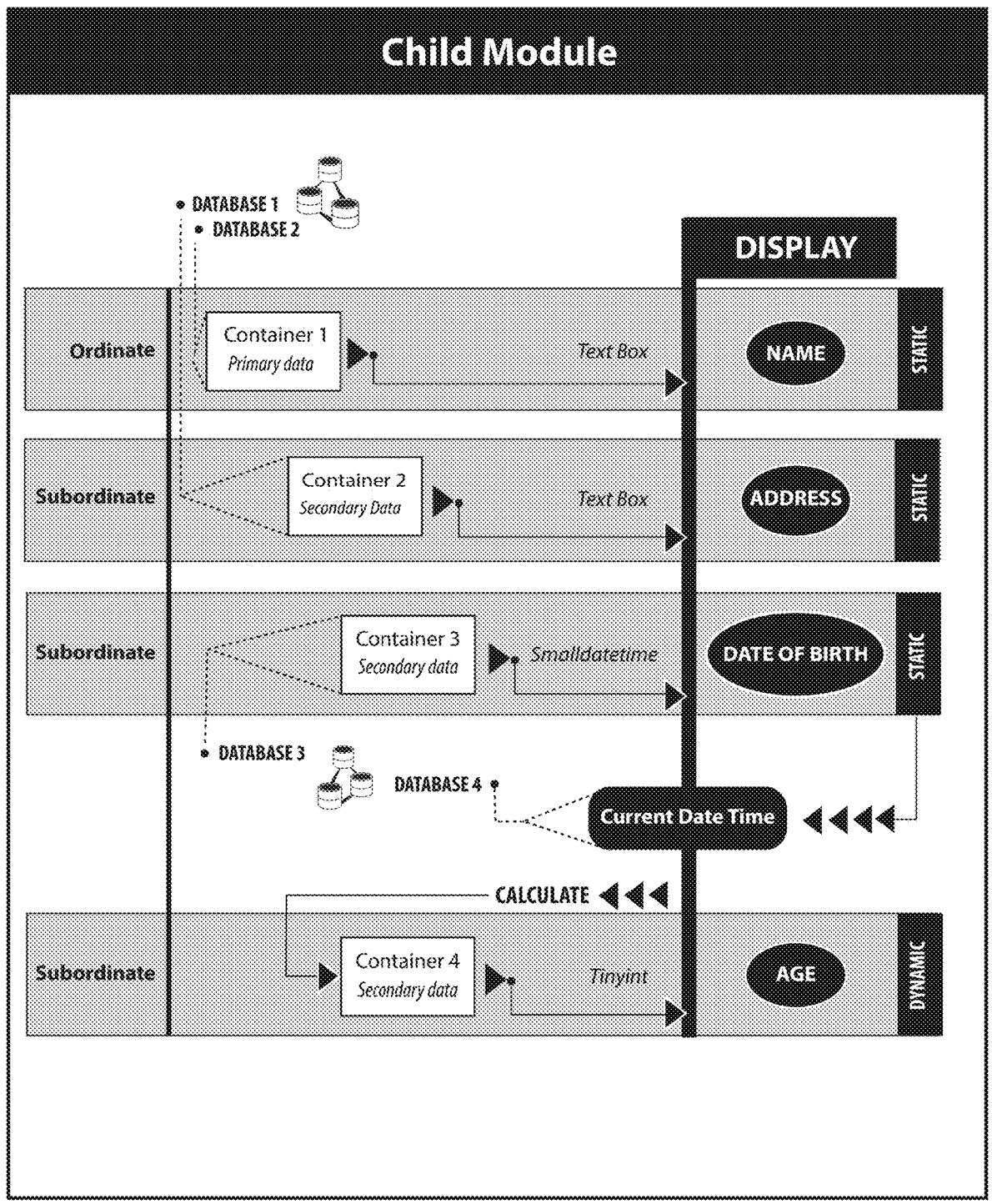
FIG. 5 is a flow diagram illustrating an example embodiment of a child module pulling data from root files stored in local and remote databases to populate a plurality of containers wherein dynamic data is computable for display from displayed static data.

Containers may store static data values, such as a person's name, for example, or dynamic values, calculable based on other static values and other variables. As shown in FIG. 5, a primary data is stored in a first container, container 1, and devised to display as a text box. A database, Database 2, is associated with Container 1, and populates the text box with NAME displayed in an associated field in the graphical user interface of the child module. Secondary data pertaining to the primary data in subordinate relationship thereto is populated from Database 1 and includes, in this example, an associated ADDRESS discoverable under the primary data, NAME, to populate display of ADDRESS as text in an associated field in the graphical user interface of the instant child module. A third container, Container 3, is devised to display dates, and pulls data associated with the primary data NAME from a third database, Database 3, to populate DATE OF BIRTH data as a date displayed in an associated field in the graphical user interface of the instant child module. A fourth container, Container 4, is devised to display dynamic secondary data, subordinate to the DATE OF BIRTH data, as an integer calculated by reference to the DATE OF BIRTH data stored in Container 3 and a CURRENT DATE TIME referable via a fourth database, Database 4. Thus Container 4 stores a dynamic data value, AGE, computed by cross-reference between data stored in Container 3 and a data accessible over network in Database 4 (the CURRENT DATE TIME). Persons having ordinary skill in the art will appreciate this simplified example is illustrative of multiple applications between containers in any number of instances of child modules, enabling computation and display of dynamic data values.

Various files and file-types may be accessed locally and remotely over network via the child module, to populate each of the plurality of containers operative in the child module. Thus a primary data may enable search, discovery, access, and retrieval of associated secondary data, extractable from different file-types discovered at different assigned locations and/or partitions, whereby the child module pulls over network to extract, load, and interface secondary data relevant and associated with primary data. In the example illustrated as FIG. 6, certain patient health care data and a balance due for medical services is automatically displayable in fields associated with particular containers operative in the child module. File-types accessed from which relevant data is pulled include .doc, .xls, .pdf, and .qb files in this relevant example. Data is thus extractable from these file-types and reconfigured for display in the corresponding container designated to articulate that particular data.

Thus "Patient Account Number", in this example recorded in an excel spreadsheet in Database 1, is identified as the primary data for the current instance viewed in the corresponding child module. The Patient Account Number is thence displayable via Container 1 when the child module is run. Secondary data associated with Container 1 includes "Patient Name", "Patient Address", "Patient Contact Information" (which could be email, phone number, or other pertinent data displayable as part of a list view), and "Health Insurance Information" (health care provider, for example, PPO or HMO, say). In the present example, this secondary data is pulled from Database 2 over network. Further secondary information associated with, and subordinate to, the primary data (in this example instance, the "Patient Account Number") is pulled from a third location over network, from Database 3, which in this example is hosted at a partition at a corresponding HMO database, determinable in this example instance by the "Patient Health Insurance Information" secondary data extracted from Database 2. Secondary data pulled from Database 3, in this example instance, includes "Patient HMO Policy Number" and "Patient HMO Policy" as an attached file viewable through the child module in association with Container 7.

Further secondary data is dynamically calculated by extracting relevant payment information from a .qb file, in this example instance stored on a local partition, whereby a balance due value is displayable in a field associated with Container 8. The balance due is calculable by computation of an invoiced amount ("invoice No.") compared with a payment history ("Payment Received") having that invoice number associated therewith.

Figure 6:
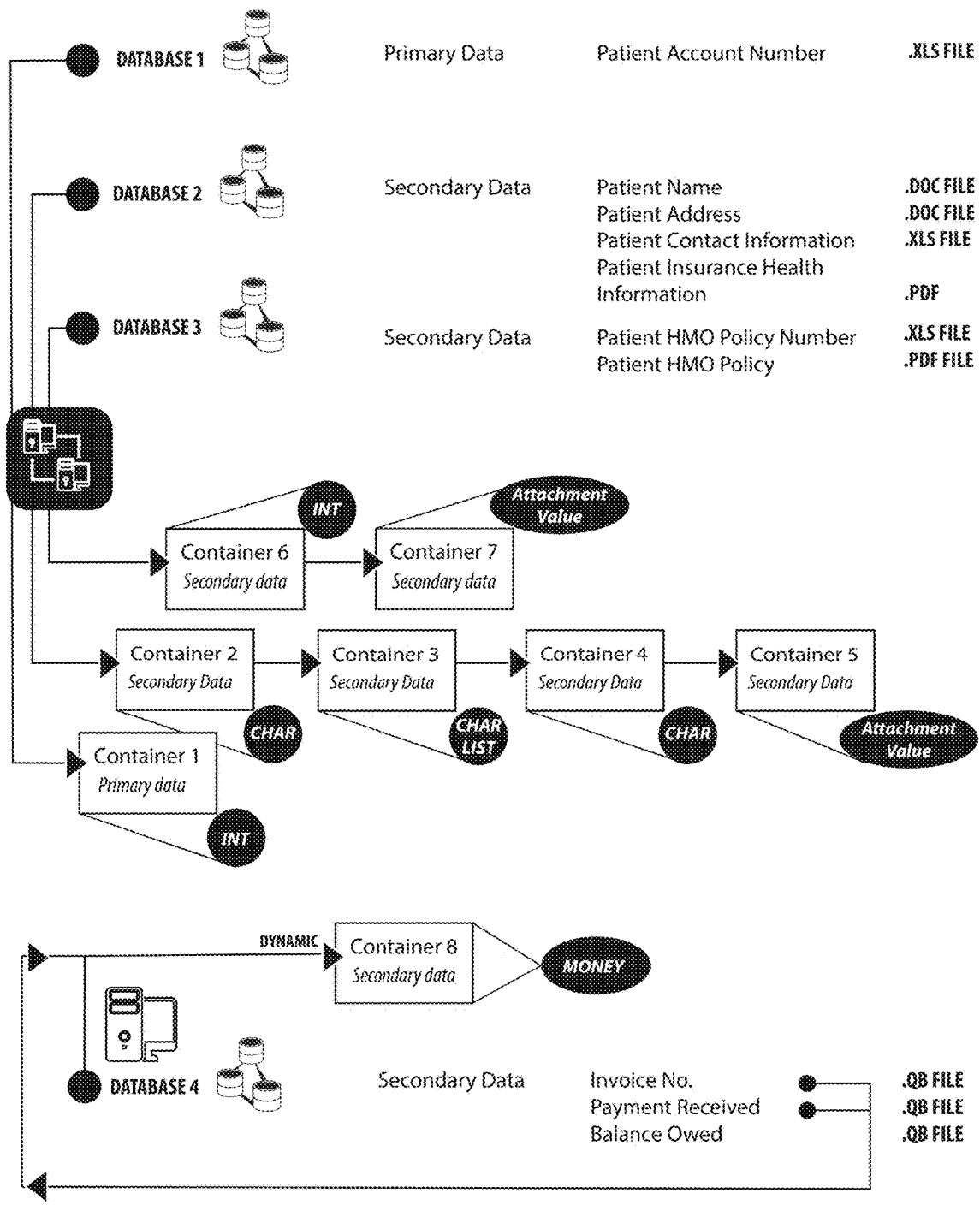
FIG. 6 is a flow diagram illustrating an example embodiment of a child module pulling data from root files of different file-types, stored in local and remote databases, to populate a plurality of containers wherein displayed data is interactive and updateable by a user at a single instance.

In the example instance illustrated as FIG. 6, it should be clear to a person having ordinary skill that the present variable driven, customizable information management system enables cross-platform access to various files and filetypes to extract, transfer, and load data for pertinent display in an instant child module. Thus disparate information stored over network is accessible for display and interaction at a single instance. Further, read-write authorities enable updating data through the child module to effect update of associated root files whereby updated, new, or amended data may be pushed by the child module back to the root file. Conversely, changes effected directly to the root file likewise display when retrieved by the child module.

The plurality of containers is displayable as a re-orderable file display tree in the graphical user interface comprising the child module. The re-orderable file display tree illustrates association of each of the plurality of containers as a skewable data stack. The re-orderable file display tree is re-orderable between multiple ordinate and subordinate relationships of associated containers and associated data therein contained, to display unique associations and arrangements of each of the plurality of containers independently accessible irrespective of association in the data stack as determined by a user. Thus any particular data, stored in a particular one of the plurality of containers, is independently viewable and accessible independent of any other of the plurality of containers, irrespective of the relationship of the data therein contained relative other ordinate or subordinate containers associated therewith.

For ease of viewing ordered and arranged information displayable upon the graphical user interface comprising the child module, a plurality of set views is reconfigurable, defaulted by a user, when selection between each of a plurality of macro tabs, displayed as part of the child module graphical user interface, is effected by a user.

Thus, for example, an end user may sort data onscreen and affiliate various like containers, say. This is particularly useful for sorting data and generating reports (s.a. for example a report containing secondary data corresponding to a number of primary data files, for example a list of account numbers, perhaps, associated with primary data comprising patient names, for example, or accounts receivable, say, from numerous instances of other higher order data).

Display of data by the child module may be controlled between particular end users as displayed under operation of at least one security mask. Different users, having different assigned access levels, may therefore see and access different data stored locally and remotely depending on a settable user security level which corresponds to running the at least one security mask. The security mask may be operable to prevent some users discovering particular data.

Figure 7:
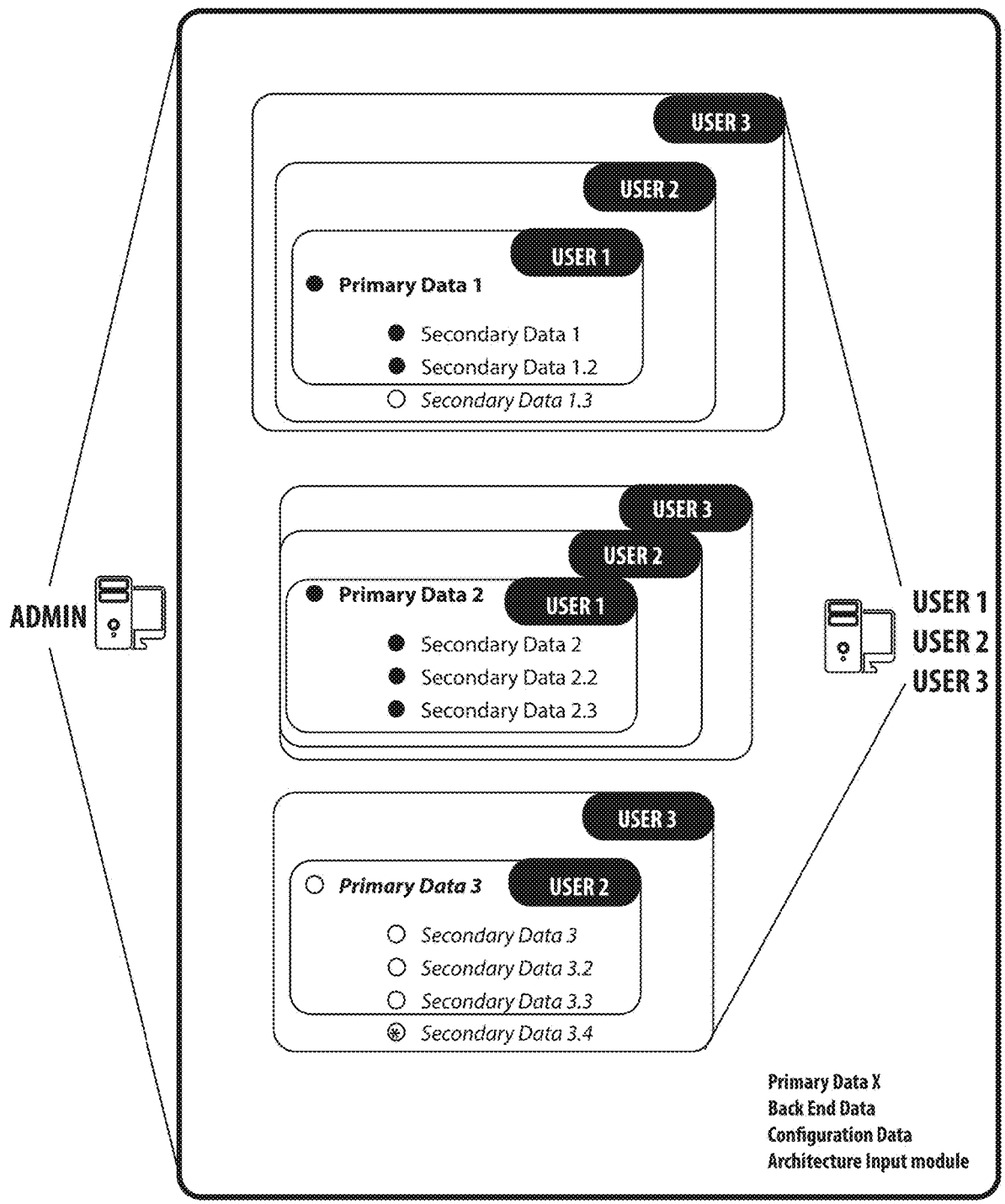
FIG. 7 is a logic diagram illustrating example user access levels to data accessible through the child module wherein different users have access to different files by action of a security mask operating upon the child module.

As shown in FIG. 7, individual users logging into the module may, therefore, enable running of a security mask depending on a user credential entered into the child module when running the child module. Data is classifiable between security levels whereby a user access level enables access to data only classified within that access level. In the example instance illustrated as FIG. 8, User 1 has a first order access level, and may see Primary Data 1, and secondary data subordinate to Primary Data 1, Secondary Data 1 and Secondary Data 1.2. User 1 is not authorized to see Secondary Data 1.3, and secondary 1.3 is not visible on the instance of the child module runnable by User 1. User 1 is also enabled access to Primary Data 2 and all secondary data subordinate to Primary Data 2. User 1 is unable to access Primary Data 3 or any of the secondary data subordinate to Primary Data 3.

User 2's access level grants access to Primary Data 1 and all secondary data subordinate thereto, Primary Data 2 and all secondary data subordinate thereto, and Primary Data 3 and all secondary data subordinate thereto with the exception of Secondary Data 3.4. User 3's access level grants access to all data with the exception of data available only to ADMIN who has access to all data within the child module instance, including controlling back end data and the architecture input module.

Thus tiered access may be ensured and certain data may be prevented from display or access between particular users. Read-write privileges are likewise controllable by action of the at least one security mask. In some instances users may be able to see data and not interact with it. In other instances some users may not even see particular data that is accessible to other users and executable by yet other users. An administrator tier enables full access and designation of access levels between all users authorized to use the child module (e.g ADMIN as shown in FIG. 7). A settable user security level therefore controls read-write access to all partitioned data accessible through the child module.

Security masks are also applicable to various data fields, and then assignable to a user access level. As shown in the example embodiment illustrated as FIG. 8, a child module "Media Table" instance, designated as "Member" 502, is accessible by input panel 500. Root files are extractable from a location designated by the "Doc Table" field, in this example instance as a file identifiable as "Member Section" 504.

In order to expedite creation of child modules, a previously created child module is usable by the architecture input module to extract, transfer, and load all data into a newly created child module. All data is thereby transmittable to create a new child module. Thus data fields may be rapidly deployed into a new child module, said data fields having like denominations as rendered in the previously created child module for subsequent customization able to be thereafter effected, where desired. First order data and second order data may also be maintained associated within and between like containers rendered relative the previously created child module within the newly created child module.

Priority of read-write access to data in any particular one of the plurality of containers when active between more than one user is exclusive to each accessing user by action of a time stamp. Read-write conflicts as may arise when multiple users access the same container, resolve to priority indicated by read of the timestamp. Edited files may be savable by the system as previous iterations whereby previous versions of edited files are maintained for access. A record of each user effecting edits is likewise recordable and maintainable by the system.

What is claimed is:

1. A method comprising the steps of:

displaying a graphically displayable architecture input module having a plurality of data fields displayed therein;

enabling manual input of command data into each of said plurality of data fields, said command data enterable as field nominative strings and input data strings that name, format, and control an associated graphically displayable child module;

whereby the said child module is graphically articulable, formattable, and customizable for select management, presentation, association, retrieval, display of, and interaction with, locally and remotely accessible data;

said associated child module comprising:

a plurality of prompt and display fields, each of said plurality of prompt and display fields denominated and classified according to at least one of the field nominative strings as entered into the architecture input module;

wherein each of said plurality of prompt and display fields enables capture of particular data manually enterable as prompted input strings, said particular data extracted from associated files available locally and remotely as a plurality of different file-types determinable by each input prompt string;

wherein a plurality of containers interactively displays locally and remotely hosted data files, said locally and remotely hosted data files accessible locally and remotely over network; and wherein a re-orderable file display tree is generable to graphically depict association of each of the plurality of containers as a data stack, said re-orderable file display tree re-orderable to display unique associations and arrangements of each of the plurality of containers independently accessible irrespective of association in the data stack as determined by a user;

wherein the architecture input module enables expedient customization of the child module for management of information particular to the needs of a specific end user for whom a corresponding unique child module is creatable, whereby management of unique information, directly input into the child module, and accessed over local and wide area network, is uniquely creatable, customizable, accessible, storable, editable, and controllable.

2. The method of claim 1 wherein the child module further comprises:

a plurality of primary data fields, each of said plurality of primary data fields devised to receive input of first order, ordinate data; and a plurality of secondary data fields, each of said plurality of secondary data fields associated with at least one of the plurality of primary data fields and devised to receive input of second order, subordinate data, which second order data is dependent and contingent on precedent first order data;

wherein first order data and second order data entered into corresponding primary data fields and secondary data fields are stored associable locally and associable remotely over network and are graphically displayable and manageable as part of a graphical user interface and the re-orderable file display tree.

3. The method of claim 2 wherein the child module is instantly reconfigurable between a plurality of set views by selection between each of a plurality of macro tabs selectable by a user, whereby interchange between the plurality of set views as a selection of preconfigured graphical displays is defaulted.

4. The method of claim 3 wherein the display of data by the child module is controllable under at least one security mask, whereby different users of assigned access levels may see and access different data stored locally and remotely depending on a settable user security level corresponding to running the at least one security mask.

5. The method of claim 4 wherein data stored in any one of the plurality of containers displayed as part of the re-orderable file display tree is readily retrievable irrespective of any particular ordering of the data stack displayed as the re-orderable file display tree.

6. The method of claim 5 wherein existing data of particular file-types is associable with each of the plurality of containers as an attachment value, said existing data of particular filed-types thereby accessible to a user loading data accessed within a particular one of the plurality of containers.

7. The method of claim 6 wherein data accessed from within particular ones of the plurality of containers is assemblable locally and remotely over network between a plurality of partitions and storage locations, whereby data is constructible for read-write interaction from dispersed and non-unified locations.

8. The method of claim 7 wherein data accessed between particular ones of the plurality of containers is assemblable locally and remotely over network between a plurality of partitions and storage locations, whereby data is constructible for read-write interaction from dispersed and non-unified locations.

9. The method of claim 8 wherein assignment of a user access level controls read-write access to all partitioned data for each user.

10. The method of claim 9 wherein a previously created child module is usable by the architecture input module to extract, transfer, and load all data into a newly created child module, wherein data fields and first order data and second order data are maintainable associated within and between like containers rendered relative the previously created child module and the newly created child module.

11. The method of claim 10 wherein a previously created child module is usable by the architecture input module to extract, transfer, and set up the format, layout, and prompt fields of a newly created child module whereby field nominative strings are automatically extracted and applied to create like naming of prompt fields in the newly created child module.

12. The method of claim 11 wherein priority of read-write access to data in any particular one of the plurality of containers is exclusive to accessing users denominated and controlled by action of a time stamp, whereby read-write conflicts resolve to priority.

13. The method of claim 12 wherein all data is searchable and displayable ordered by primary and secondary data.

* * * * *